United States Patent
Yamaguchi et al.

(10) Patent No.: US 6,251,823 B1
(45) Date of Patent: Jun. 26, 2001

(54) PRODUCTION OF SPHERICAL CATALYST CARRIER

(75) Inventors: Toshio Yamaguchi, Tokyo; Kikoo Uekusa, Chiba, both of (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 09/371,495

(22) Filed: Aug. 10, 1999

(30) Foreign Application Priority Data

Aug. 12, 1998 (JP) .................................................. 10-227962
Aug. 27, 1998 (JP) .................................................. 10-241804

(51) Int. Cl.[7] ................................................... B01J 32/00
(52) U.S. Cl. ........................................... 502/439; 423/628
(58) Field of Search ................................. 502/439, 159, 502/402, 415; 423/628

(56) References Cited

U.S. PATENT DOCUMENTS 4,089,941 * 5/1978 Villemin ................................ 423/654
4,179,408 * 12/1979 Sanchez et al. ...................... 252/448

FOREIGN PATENT DOCUMENTS

410167724A * 6/1998 (JP) .

* cited by examiner

Primary Examiner—Steven P. Griffin
Assistant Examiner—Christina Ildebrando
(74) Attorney, Agent, or Firm—Dykema Gossett PLLC

(57) ABSTRACT

A process for producing spherical catalyst carrier of silica, silica-alumina composition, zirconia-alumina composition, titania-alumina composition, boria-alumina composition, or boria-silica-alumina composition which has almost the same pore characteristics as alumina hydrate gel, silica-alumina hydrate gel, zirconia-alumina hydrate gel, or titania-alumina hydrate gel (or alumina hydrate paste, boria-alumina hydrate paste, or boria-silica-alumina hydrate paste) as the major raw material, having uniform sphericity and smooth surface and homogeneity, and has a macropore volume that can be controlled includes adding a polysaccharide solution to any of alumina, silica-alumina, zirconia-alumina, or titania-alumina in the form of hydrate gel, or alumina, boria-alumina, or boria-silica-alumina in the form of hydrate paste, mixing them to form a slurry with a controlled concentration, dropping the slurry into a solution containing multivalent metal ions, thereby forming spherical hydrogel, and performing the additional steps of aging, washing, drying, and calcining.

10 Claims, No Drawings

PRODUCTION OF SPHERICAL CATALYST CARRIER

BACKGROUND OF THE INVENTION

1. Field of the Invention

The present invention relates to a process for producing a spherical catalyst carrier, such as alumina spherical carrier, silica-alumina spherical carrier, zirconia-alumina spherical carrier, titania-alumina spherical carrier, boria-alumina spherical carrier, and boria-silica-alumina spherical carrier. This process permits easy production of a spherical carrier which has a pore structure almost identical to that of the major raw material such as alumina hydrate gel, silica-alumina hydrate gel, zirconia-alumina hydrate gel, titania-alumina hydrate gel, alumina hydrate paste, boria-alumina hydrate paste, and boria-silica alumina hydrate paste. The spherical catalyst carrier is composed of any of alumina, silica-alumina composition, zirconia-alumina composition, titania-alumina composition, boria-alumina composition, and boria-silica-alumina composition.

2. Description of the Related Art

A spherical carrier made of alumina is used as an adsorbent, catalyst, or catalyst carrier in the chemical industry and petrochemical industry. Also, a carrier of any of silica-alumina composition, zirconia-alumina composition, titania-alumina composition, boria-alumina composition, and boria-silica-alumina composition is used more extensively in the above-mentioned technical fields because of its larger specific surface area, better acid resistance and heat resistance, and higher solid acid concentrations as compared with the above-mentioned alumina carrier.

In general, a spherical carrier supporting a catalytic active metal is filled in a fixed-bed reactor or moving-bed reactor. Being spherical, it is uniformly filled in the reactor and easily removed from the reactor. Moreover, it does not cause channeling (a phenomenon that the reactant flows along a bypass during operation). It is also essential for reactions in a moving-bed reactor in which the reactant flows or moves downward by gravity.

Such a spherical carrier as mentioned above is produced by a "dropping in oil" process or a tumbling granulating process. According to the former process, an alumina spherical carrier is produced by gelling alumina sol in an alkaline atmosphere with hexamethylenetetramine or urea which decomposes at high temperatures to give off ammonia. The resulting spherical carrier has a smooth surface and is almost truly spherical. The gel made from alumina sol is homogeneous (from the surface to the inside) and has micropores with a diameter smaller than 50 Å.

The tumbling granulating process involves the steps of tumbling properly moistened alumina hydrate powder, thereby forming granules, and spraying water and supplying properly moistened alumina hydrate powder alternately, thereby thickening the layers and growing the granules. It yields a spherical carrier with a slightly rough surf ace and a broad distribution of sphericity. Granules formed by tumbling consist of layers and pores varying in size (ranging from macro to micro). Despite these disadvantages, it is widely used because of the low production cost.

A spherical carrier for a moving-bed reactor flows and/or moves during reaction and hence is required to have good wear resistance and a uniform, smooth surface. Therefore, it is produced mainly by the "dropping in oil" process. Despite its smooth surface and homogeneity, a spherical carrier made by the "dropping in oil" process contains micropores (smaller than 50 Å in diameter) which account for a large portion. Such micropores are undesirable in some application areas, such as waste gas purification, in which physical poisoning and reduction in catalytic activity occur due to pore clogging.

In general, the performance of a catalyst is closely related with the pore characteristics of the carrier. Consequently, the carrier should have physical properties required of individual reaction conditions.

SUMMARY OF THE INVENTION

The present invention was completed to address the above-mentioned problems. It is an object of the present invention to provide a process for producing a spherical catalyst carrier of alumina, silica-alumina composition, zirconia-alumina composition, titania-alumina composition, boria-alumina composition, or boria-silica-alumina composition, from alumina hydrate gel, silica-alumina hydrate gel, zirconia-alumina hydrate gel, titania-alumina hydrate gel, alumina hydrate paste, boria-alumina hydrate paste, or boria-silica-alumina hydrate paste. The carrier has almost the same pore structure as that of the raw material, uniform sphericity, smooth surface, and good homogeneity. In addition, the carrier permits its micropore volume to be controlled as desired.

The gist of the present invention resides in a process for producing a spherical catalyst carrier which involves adding a polysaccharide solution to any of alumina, silica-alumina, zirconia-alumina, or titania-alumina in the form of hydrate gel, mixing them to form a slurry with a controlled concentration, dropping the slurry into a solution containing multivalent metal ions, thereby forming spherical hydrogel, and performing the additional steps of aging, washing, drying, and calcining. According to the present invention, the polysaccharide solution to be added to the hydrate gel is a 1.0–3.0 wt % solution of low-methoxyl pectin or sodium alginate and the amount of the polysaccharide solution is 3–10 times the amount of the hydrate gel in terms of oxide (by weight), and the slurry contains 5–20 wt % of alumina, silica-alumina, zirconia-alumina, or titania-alumina in terms of oxide.

According to the present invention, the above-mentioned process is modified such that the polysaccharide solution is added to and mixed with an alumina hydrate paste which is formed from alumina hydrate gel and additional alumina hydrate powder. In this case, the amount of alumina hydrate powder (in terms of oxide) is 20–60 wt % of the alumina hydrate gel (in terms of oxide), the polysaccharide solution to be added to the alumina hydrate paste is 1.0–3.0 wt % solution of low-methoxyl pectin or sodium alginate, and the amount of the polysaccharide solution to be added to the alumina hydrate paste is 3–10 times the amount of the alumina hydrate gel in terms of oxide (by weight).

According to the present invention, the above-mentioned process is modified such that the polysaccharide solution is added to and mixed with a boria-alumina hydrate paste which is formed from the alumina hydrate gel and additional boron or a boria-silica-alumina hydrate paste which is formed from the silica-alumina hydrate gel and additional boron. In this case, the polysaccharide solution to be added to the boria-alumina hydrate paste or boria-silica-alumina hydrate paste is 1.0–3.0 wt % solution of low-methoxyl pectin or sodium alginate, and the amount of the polysaccharide solution to be added to the boria-alumina hydrate paste or boria-silica-alumina hydrate paste is 3–10 times the amount of the hydrate paste in terms of oxide (by weight).

According to the present invention, the slurry contains 5–20 wt % of boria-alumina or boria-silica-alumina in terms of oxide, and the solution of multivalent metal ions contains 0.5–3.0 wt % of at least one of calcium, aluminum, magnesium, barium, or strontium. After washing, the spherical alumina or silica-alumina hydrogel is hydrogel is dried at 60–120° C. and calcined at 500–900° C. Alternatively, after washing, the spherical zirconia-alumina hydrogel or titania-alumina hydrogel is dried at 60–120° C. and calcined at 400–700° C. Alternatively, after washing, the spherical boria-silica-alumina hydrogel is dried at 60–120° C. and calcined at 500–1,400° C.

DETAILED DESCRIPTION OF THE INVENTION

The major raw material used in the process of the present invention is alumina hydrate gel, silica-alumina hydrate gel, zirconia-alumina hydrate gel, or titania-alumina hydrate gel. They are produced by any one of the following methods.
(1) Alumina hydrate gel: First, an alumina hydrate slurry is formed by hydrolysis from a solution of aluminum in a mineral acid and a solution of aluminum-alkali metal salt. To the aluminum hydrate slurry are added the two solutions alternately and repeatedly so as to form pseudo boemite alumina whose particle size can be established as desired by controlling the number of the above-mentioned steps repeated. Alternatively, an alumina hydrate slurry is formed by adding a solution of aluminum-alkali metal salt to a solution of aluminum in a mineral acid in the presence of hydroxycarboxylic acid. To the aluminum hydrate slurry are added the two solutions simultaneously so as to form pseudo boemite alumina whose particle size can be established as desired by changing the ratio of the alumina hydrate formed. The alumina hydrate slurry obtained by either of the above-mentioned methods is finally filtered and washed to give the desired alumina hydrate gel.
(2) Silica-alumina hydrate gel: First, a water-soluble compound composed of mainly of aluminum is hydrolyzed to give an alumina hydrate slurry. To this slurry is added an aqueous solution composed mainly of silicon so as to give a silica-alumina hydrate slurry. This slurry is finally filtered and washed to give the desired silica-alumina hydrate gel. Any other commonly used mixing method or precipitation method may be used.
(3) zirconia-alumina hydrate gel: The process starts with hydrolyzing a water-soluble compound composed mainly of aluminum, thereby giving an alumina hydrate slurry. Then, this slurry is incorporated with an aqueous solution composed mainly of zirconia. The resulting zirconia-alumina hydrate slurry is filtered and washed to give the desired zirconia-alumina hydrate gel. The alumina hydrate slurry may be filtered and washed to give alumina hydrate gel, which is subsequently incorporated with zirconia sol to give zirconia-alumina hydrate paste. Any other commonly used mixing method or precipitation method may be used.
(4) Titania-alumina hydrate gel: The process starts with hydrolyzing a water-soluble compound composed mainly of aluminum, thereby giving an alumina hydrate slurry. Then, this slurry is incorporated with an aqueous solution composed mainly of titania. The resulting titania-alumina hydrate slurry is filtered and washed to give the desired titania-alumina hydrate gel. The alumina hydrate slurry may be filtered and washed to give alumina hydrate gel, which is subsequently incorporated with titania sol to give titania-alumina hydrate paste. Any other commonly used mixing method or precipitation method may be used.

In the processes (2) to (4) above, the water-soluble compound composed mainly of aluminum includes aluminum nitrate, aluminum sulfate, aluminum chloride, and sodium aluminate; the aqueous solution composed mainly of silicon includes those of sodium silicate, silicon tetrachloride, and colloidal silica; the aqueous solution composed mainly of zirconia includes those of zirconium sulfate, zirconium chloride, and zirconium nitrate; and the aqueous solution composed mainly of titania includes those of titanium sulfate, titanium trichloride, and titanium tetrachloride.

According to the present invention, 1.0–3.0 wt % solution of polysaccharide is added to any of the alumina hydrate gel, silica-alumina hydrate gel, zirconia-alumina hydrate gel, and titania-alumina hydrate gel obtained as mentioned above. The amount of the solution is 3–10 times that of the alumina hydrate gel in terms of oxide.

The polysaccharide includes, for example, low-methoxyl (L.M.) pectin or sodium alginate. The polysaccharide solution should preferably have a concentration of 1.0–3.0 wt % in consideration of solubility in warm water. Solutions with a concentration higher than 3.0 wt % take a long time for dissolution. Solutions with a concentration lower than 1.0 wt % do not take a long time for dissolution but need to be added in a large amount. As the result, it is difficult to adjust the concentration of the slurry mixed with the polysaccharide solution.

According to the present invention, the amount of the polysaccharide solution should be 3–10 times the weight of the alumina hydrate gel, silica-alumina hydrate gel, zirconia-alumina hydrate gel, or titania-alumina hydrate gel (in terms of oxide). If the amount is less than 3 times, the resulting carrier will not be spherical. Even though the amount is more than 10 times, no additional effect (of improving sphericity) is produced.

According to the present invention, the slurry resulting from incorporation with the polysaccharide solution should contain 5–20 wt % of alumina, silica-alumina, zirconia-alumina, or titania-alumina in terms of oxide. With a concentration higher than 20 wt %, the slurry is too viscous to drop at a constant rate from an outlet with a certain opening. This results in irregular coarse elliptic particles with a concentration lower than 5 wt %, the slurry gives irregular "teardrop" particles.

The polysaccharide solution is added to and mixed with the alumina hydrate gel, silica-alumina hydrate gel, zirconia-alumina hydrate gel, or titania-alumina hydrate gel. The resulting slurry, with its concentration adjusted, is dropped into a solution containing multivalent metal ions so as to form spherical alumina hydrogel, spherical silica-alumina hydrogel, spherical zirconia-alumina hydrogel, or spherical titania-alumina hydrogel. The hydrogel is aged, washed, dried, and finally calcined to give the desired spherical carrier.

According to the present invention, the multivalent metal ions include such divalent metal ions as calcium ions, aluminum ions, magnesium ions, barium ions, and strontium ions. The solution of multivalent metal ions may be formed from a metal salt containing such divalent metal ions. Two and/or three solutions mixed together may be used.

The solution containing multivalent metal ions should have a concentration of 0.5–3.0 wt %. With a concentration lower than 0.5 wt % or higher than 3.0 wt %, the solution does not give an adeguate spherical carrier.

The foregoing gave a process for producing an alumina spherical carrier by adding a solution of polysaccharide directly to alumina hydrate gel as one of the major raw materials. For easy control of macropore volume, it is desirable to follow three steps given below to obtain an alumina spherical carrier, boria-alumina spherical carrier, or boria-silica-alumina spherical carrier.

(a) The alumina hydrate gel produced as in (1) above is incorporated further with alumina hydrate powder so as to form an alumina hydrate paste. To this alumina hydrate paste is added a solution of polysaccharide in the same way as mentioned above. The resulting slurry with a controlled concentration is dropped into a solution containing multivalent metal ions so that spherical alumina hydrogel is formed. This alumina hydrogel is aged, washed, dried, and finally calcined to give the desired alumina spherical carrier. In other words, the foregoing example illustrates the process that employs alumina hydrate gel as the starting material; however, it is desirable to add further alumina hydrate powder to said alumina hydrate gel, thereby giving alumina hydrate paste, so as to facilitate the control of macropore volume.

The alumina hydrate powder used in this case may be commercial one or one which is obtained from the above-mentioned alumina hydrate gel. In the latter case, alumina hydrate gel is mixed with water to give an alumina hydrate slurry, and the resulting slurry is spray-dried by a spray dryer of two-fluid nozzle type or rotary disk type so as to give the desired alumina hydrate powder.

The alumina hydrate powder is added to and mixed with the alumina hydrate gel to give the desired alumina hydrate paste. The amount of the alumina hydrate powder (in terms of oxide) is 20–60 wt % of the alumina hydrate gel in terms of oxide. An amount less than 20 wt % is not enough to form sufficient macropores. An amount more than 60 wt % gives a large number macropores, with the resulting catalyst carrier being too weak for practical use.

Then, to the above-mentioned alumina hydrate paste is added 1.0–3.0 wt % solution of polysaccharide in an amount of 3–10 times the amount of alumina hydrate paste in terms of oxide. The amount of the solution is specified for the same reason as above.

(b) To the alumina hydrate gel produced as mentioned above in (1) is added boron and/or boron aqueous solution. The resulting mixture is kneaded to give the desired boria-alumina hydrate paste.

(c) To the silica-alumina hydrate gel produced as mentioned above in (2) is added boron and/or boron aqueous solution. The resulting mixture is kneaded to give the desired boria-silica-alumina hydrate paste.

The raw material of boron includes ortho-boric acid, meta-boric acid, and water-soluble borate such as ammonium borate.

The boria-alumina hydrate paste prepared in (b) or the boria-silica-alumina hydrate paste prepared in (c) is incorporated with a solution of polysaccharide.

The polysaccharide may be low-methoxyl (L.M.) pectin or sodium alginate. The concentration of the solution should preferably be 1.0–3.0 wt % for adequate solubility in warm water. A concentration higher than 3.0 wt % causes the solute to take a long time for dissolution. A concentration lower than 1.0 wt % permits the solute to dissolve rapidly; however, a dilute solution has to be added in a large amount, which makes it difficult to adjust the concentration of the slurry mixed with the polysaccharide solution.

Then, to the above-mentioned alumina hydrate paste or boria-silica-alumina hydrate paste is added a 1.0–3.0 wt % solution of polysaccharide in an amount of 3–10 times the amount of the hydrate paste in terms of oxide. The amount of the solution is specified for the same reason as above.

After the addition of the polysaccharide solution, the resulting slurry is properly diluted so that its concentration is within 5–20 wt % in terms of boria-alumina oxide or boria-silica alumina oxide. With a concentration higher than 20 wt %, the slurry is too viscous to drop at a constant rate from an outlet with a certain opening. This results in irregular coarse elliptic particles. With a concentration lower than 5 wt %, the slurry gives irregular "teardrop" particles.

The thus obtained slurry with a controlled concentration is then dropped into a solution containing multivalent metal ions in the same way as mentioned above, so as to form spherical boria-alumina hydrogel or spherical boria-silica-alumina hydrogel. The multivalent metal ions include such divalent metal ions as calcium ions, aluminum ions, magnesium ions, barium ions, and strontium ions. The solution of multivalent metal ions may be formed from a metal salt containing such divalent metal ions. Two and/or three solutions mixed together may be used. The concentration of the solution should preferably be 0.5–3.0 wt %. With a concentration lower than 0.5 wt % or higher than 30 wt %, the solution does not yield the desired spherical carrier.

The above-mentioned procedure gives spherical alumina hydrogel, spherical silica-alumina hydrogel, spherical zirconia-alumina hydrogel, spherical titania-alumina hydrogel, spherical boria-alumina hydrogel, or spherical boria-silica-alumina hydrogel. The hydrogel is aged, washed, dried, and finally calcined to give the desired spherical carrier.

To be more specific, the hydrogel composed mainly of spherical alumina or spherical silica-alumina is aged, dried at 60–120° C. for 10–15 hours, and finally calcined at 500–900° C. to give the desired spherical alumina carrier or spherical silica-alumina carrier. Incidentally, the spherical alumina carrier was found to have the crystal structure of $\gamma$-$Al_2O_3$.

Alternatively, the hydrogel composed mainly of spherical zirconia-alumina or spherical titania-alumina is aged, dried at 60–120° C. for 10–15 hours, and finally calcined at 400–700° C. to give the desired spherical zirconia-alumina carrier or spherical titania-alumina carrier.

Furthermore, the hydrogel composed mainly of spherical boria-alumina is aged, dried at 60–120° C. for 10–15 hours, and finally calcined at 500–1,300° C. to give the desired spherical boria-alumina carrier.

Moreover, the hydrogel composed mainly of spherical boria-silica-alumina is aged, dried at 60–120° C. for 10–15 hours, and finally calcined at 500–1,400° C. to give the desired spherical boria-silica-alumina carrier.

EXAMPLES

The invention will be described in more detail with reference to the following examples and comparative examples. In these examples, pore characteristics were determined by mercury porosimetry on the assumption that the surface tension of mercury is 480 dyn/cm and the contact angle of mercury with the sample is 140°.

Example 1

In a 50-liter stainless steel reactor vessel, equipped with a stirrer, was placed 21 liters of water. To the vessel was added 703 g of aqueous solution containing 5.4 wt % of aluminum nitrate (in terms of $Al_2O_3$). To the solution, heated to and kept at 70° C., was added dropwise with stirring 760 g of aqueous solution containing 9.2 wt % of sodium aluminate (in terms of $Al_2O_3$). After aging for 5 minutes, there was obtained a slurry of alumina hydrate with pH 8.9.

To this slurry was added dropwise 880 g of said aqueous solution of aluminum nitrate. After aging for 5 minutes, there was obtained a slurry of alumina hydrate with pH 3.2. To the slurry was added dropwise 880 g of said aqueous solution of sodium aluminate. After aging for 5 minutes, there was obtained an alumina hydrate slurry with pH 9.2.

The procedure of dropping alternately the aqueous solution of aluminum nitrate and the aqueous solution of sodium aluminate was repeated five times. The resulting slurry of alumina hydrate was filtered. Thus there was obtained alumina hydrate cake (1") which was washed until the content of $Na_2O$ became lower than 0.1 wt %. A portion of this alumina hydrate cake (1") was dried at 80° C. for 15 hours and then calcined at 600° C. for 3 hours. There was obtained solid alumina (1").

To 454 g of the alumina hydrate cake (1") (equivalent to 100 g of $Al_2O_3$) were added 500 g of solution containing 1.5 wt % sodium alginate (equivalent to 5 times the amount of $Al_2O_3$) and 46 cc of water. After thorough stirring and mixing, there was obtained a slurry containing 10 wt % $Al_2O_3$ (as solids).

This slurry was added dropwise to a 10-liter pyrex reactor vessel, equipped with a stirrer, containing 1.2 wt % solution of calcium chloride, through a dropper with an opening 4.5 mm in diameter, so that spherical gel was formed. After aging for 5 minutes, this spherical hydrogel was collected, washed, dried at 80° C. for 15 hours, and finally calcined at 600° C. for 3 hours. Thus there was obtained an alumina spherical carrier (1).

The thus obtained solid alumina (1") and alumina spherical carrier (1) were tested for pore characteristics and physical properties. The results are shown in Table 1 below.

It is noted from Table 1 that the alumina spherical carrier obtained in this example has almost the same pore characteristics as those of alumina hydrate cake as the major raw material and it also has a high breaking strength and good sphericity.

Example 2

The same procedure as in Example 1 to give alumina hydrate cake (1") was repeated except that the procedure of dropping alternately the aqueous solution of aluminum nitrate and the aqueous solution of sodium aluminate into the alumina hydrolyzing vessel was repeated 9 times or 14 times. Thus there were obtained two kinds each of alumina hydrate cake (2" and 3") and solid alumina (2' and 3").

The alumina hydrate cake (2" and 3") was processed into alumina spherical carrier (2 and 3) in the same way as in Example 1 to form the spherical carrier (1).

The thus obtained solid alumina (2" and 3") and alumina spherical carrier (2 and 3) were tested for pore characteristics and physical properties. The results are shown in Table 1 below.

It is noted from Table 1 that the alumina spherical carrier obtained in Example 2 has almost the same pore characteristics as those of alumina hydrate cake as the major raw material (regardless of the manufacturing conditions) and it also has a high breaking strength and good sphericity.

Comparative Example 1

The same procedure as in Example 1 for the alumina spherical carrier (1) was repeated to give alumina spherical carriers (4 and 5), except that the amount of the 1.5 wt % solution of sodium alginate added to the alumina hydrate cake (1") was changed to one time or 15 times the amount of $Al_2O_3$.

The thus obtained alumina spherical carriers (4 and 5) were tested for pore characteristics and physical properties. The results are shown in Table 1 below.

It is noted from Table 1 that the alumina spherical carrier (4) (which was produced by giving the polysaccharide solution in an amount outside the range specified in the present invention) has good pore characteristics but takes on an elliptic shape, and the alumina spherical carrier (5) has different pore characteristics and is poor in breaking strength.

Comparative Example 2

The same procedure as in Example 1 was repeated to give alumina spherical carriers (6 and 7), except that the slurry (formed from the alumina hydrate cake (1"), 1.5 wt % solution of sodium alginate, and 5 times as much water) contained 3 wt % of $Al_2O_3$ as solids or 25 wt % of $Al_2O_3$ as solids after concentration by heating. The resulting alumina spherical carriers (6 and 7) were tested for pore characteristics and physical properties. The results are shown in Table 1 below.

It is noted from Table 1 that the alumina spherical carriers (6 and 7) (which were produced from the slurry whose concentration is outside the range specified in the present invention) have good pore characteristics but take on an elliptic or teardrop shape and are irregular in particle diameter.

Example 3

The same procedure as in Example 1 for the alumina spherical carrier (1) was repeated to give alumina spherical carriers (8 and 9) except that the 1.2 wt % solution of calcium chloride was replaced by a 1.5 wt % solution of aluminum chloride or a 1:1 (by weight) mixture of a 1.2 wt % solution of calcium chloride and a 1.5 wt % solution of aluminum chloride. The thus obtained alumina spherical carriers (8 and 9) were tested for pore characteristics and physical properties. The results are shown in Table 1 below.

It is noted from Table 1 that the alumina spherical carriers obtained in this example have almost the same pore characteristics as those of alumina hydrate cake and also have a high breaking strength and good sphericity, regardless of whether the calcium chloride solution was replaced by aluminum chloride solution or a mixture of calcium chloride solution and aluminum chloride

TABLE 1

| | | Pore characteristics | | Physical properties | |
|---|---|---|---|---|---|
| | Sample No. | Volume of pores larger than 40 Å (ml/g) | Average pore diameter (Å) | Breaking strength (kg) | Sphericity |
| Example 1 | 1' | 0.83 | 132 | — | — |
| | 1 | 0.83 | 134 | 11.5 | Almost spherical |
| Example 2 | 2' | 0.98 | 218 | — | — |
| | 2 | 0.99 | 220 | 8.8 | Almost spherical |
| | 3' | 1.27 | 429 | — | — |
| | 3 | 1.25 | 431 | 6.2 | Almost spherical |
| Comparative Example 1 | 4 | 0.84 | 130 | 10.9 | Eliptic |
| | 5 | 0.95 | 147 | 6.4 | Almost spherical |

TABLE 1-continued

| | | Pore characteristics | | Physical properties | |
|---|---|---|---|---|---|
| | | Volume of pores larger than 40 Å (ml/g) | Average pore diameter (Å) | Breaking strength (kg) | Sphericity |
| | Sample No. | | | | |
| Comparative Example 2 | 6 | 0.82 | 132 | 11.0 | Teardrop, irregular |
| | 7 | 0.83 | 134 | 10.8 | Eliptic, irregular |
| Example 3 | 8 | 0.83 | 134 | 11.3 | Almost spherical |
| | 9 | 0.82 | 135 | 11.5 | Almost spherical |

Example 4

In a 50-liter stainless steel reactor vessel, equipped with a stirrer, was placed 25 liters of water and 3,180 g of aqueous solution of aluminum sulfate (258 g in terms of $Al_2O_3$). To the solution, heated to and kept at 70° C., was added dropwise with stirring 2,310 g of aqueous solution of sodium aluminate (425 g in terms of $Al_2O_3$). After aging for 30 minutes, there was obtained an alumina hydrate slurry with pH 8.9.

The slurry was given 18 g of 30% nitric acid for adjustment to pH 6.8. To this slurry was added dropwise 543 g of aqueous solution of sodium silicate (76 g in terms of $SiO_2$). After aging for 30 minutes, there was obtained an alumina hydrate slurry with pH 8.5. This slurry was filtered and washed until the content of $Na_2O$ became lower than 0.1 wt %. Thus there was obtained silica-alumina hydrate cake (10") containing 10 wt % $SiO_2$. A portion of this silica-alumina hydrate cake (10") was dried at 80° C. for 15 hours and then calcined at 60° C. for 3 hours. There was obtained solid silica-alumina (10").

To 454 g of the silica-alumina hydrate cake (10") (equivalent to 100 g of $SiO_2$—$Al_2O_3$) were added 500 g of solution containing 1.5 wt % sodium alginate (equivalent to 5 times the amount of $SiO_2$—$Al_2O_3$) and 46 cc of water. After thorough stirring and mixing, there was obtained a slurry containing 10 wt % $SiO_2$—$Al_2O_3$ (as solid).

This slurry was added dropwise to the same reactor vessel as in Example 1 so as to form spherical hydrogel. After aging for 5 minutes, the spherical gel was rinsed, dried at 80° C. for 15 hours, and calcined at 600° C. for 3 hours. There was obtained a silica-alumina spherical carrier (10).

The thus obtained solid silica-alumina (10') and silica-alumina spherical carrier (10) were tested for pore characteristics and physical properties. The results are shown in Table 2 below.

It is noted from Table 2 that the silica-alumina spherical carrier obtained in this example has almost the same pore characteristics as those of silica-alumina hydrate cake as the major raw material and it also has a high breaking strength and good sphericity.

Example 5

The same procedure as in Example 4 to give alumina hydrate cake (10") was repeated except that the amount of sodium silicate aqueous solution dropped to the alumina hydrate slurry was changed to 257 g (36 g in terms of $SiO_2$) or 1,215 g (170 g in terms of $SiO_2$). There were obtained silica-alumina hydrate cake (11") containing 5 wt % $SiO_2$ and silica-alumina hydrate cake (12") containing 20 wt % $SiO_2$. They were processed into solid silica-alumina (11' and 12'). The two kinds of cake (11" and 12") were processed into silica-alumina spherical carriers (11 and 12), respectively, in the same way as in Example 4 to give the spherical carrier (10).

The thus obtained solid silica-alumina (11' and 12') and silica-alumina spherical carrier (11 and 12) were tested for pore characteristics and physical properties. The results are shown in Table 2 below.

It is noted from Table 2 that the silica-alumina spherical carrier obtained in this example has almost the same pore characteristics as those of silica-alumina hydrate cake even though the content of silica in silica-alumina hydrate as the major raw material was changed and it also has a high breaking strength and good sphericity.

Comparative Example 3

The same procedure as in Example 4 for the silica-alumina spherical carrier (10) was repeated to give silica-alumina spherical carriers (13 and 14), except that the amount of the 1.5 wt % solution of sodium alginate added to the silica-alumina hydrate cake (10") was changed to one time or 15 times the amount of $SiO_2$—$Al_2O_3$.

The thus obtained silica-alumina spherical carriers (13 and 14) were tested for pore characteristics and physical properties. The results are shown in Table 2 below.

It is noted from Table 2 that the silica-alumina spherical carrier (13) (which was produced by giving the polysaccharide solution in an amount outside the range specified in the present invention) has good pore characteristics but takes on an elliptic shape, and the silica-alumina spherical carrier (14) has different pore characteristics and is poor in breaking strength.

Comparative Example 4

The same procedure as in Example 4 was repeated to give silica-alumina spherical carriers (15 and 16), except that the slurry (formed from the silica-alumina hydrate cake (10"), 1.5 wt % solution of sodium alginate, and 5 times as much water) contained 3 wt % of $SiO_2$—$Al_2O_3$ as solids or 25 wt % of $SiO_2$—$Al_2O_3$ as solids after concentration by heating. The resulting silica-alumina spherical carriers (15 and 16) were tested for pore characteristics and physical properties. The results are shown in Table 2 below.

It is noted from Table 2 that the silica-alumina spherical carriers (15 and 16) (which were produced from the polysaccharide solution whose concentration is outside the range specified in the present invention) have good pore characteristics but take on an elliptic or teardrop shape and are irregular in particle diameter.

Example 6

The same procedure as in Example 4 for the silica-alumina spherical carrier (10) was repeated to give silica-alumina spherical carriers (17 and 18) except that the 1.2 wt % solution of calcium chloride was replaced by a 1.5 wt % solution of aluminum chloride or a 1:1 (by weight) mixture of a 1.2 wt % solution of calcium chloride and a 1.5 wt % solution of aluminum chloride. The thus obtained silica-alumina spherical carriers (17 and 18) were tested for pore characteristics and physical properties. The results are shown in Table 2 below.

It is noted from Table 2 that the silica-alumina spherical carriers obtained in this example have almost the same pore characteristics as those of silica-alumina hydrate cake and also have a high breaking strength and good sphericity, regardless of whether the calcium chloride solution was replaced by aluminum chloride solution or a mixture of calcium chloride solution and aluminum chloride solution.

TABLE 2

| | Sample No. | Pore characteristics | | Physical properties | |
|---|---|---|---|---|---|
| | | Volume of pores larger than 40 Å (ml/g) | Average pore diameter (Å) | Breaking strength (kg) | Sphericity |
| Example 4 | 10' | 0.84 | 103 | — | — |
| | 10 | 0.85 | 105 | 10.8 | Almost spherical |
| Example 5 | 11' | 0.75 | 100 | — | — |
| | 11 | 0.76 | 102 | 12.1 | Almost spherical |
| | 12' | 1.04 | 132 | — | — |
| | 12 | 1.03 | 130 | 8.6 | Almost spherical |
| Comparative Example 3 | 13 | 0.82 | 103 | 10.9 | Eliptic |
| | 14 | 0.97 | 121 | 6.2 | Almost spherical |
| Comparative Example 4 | 15 | 0.84 | 102 | 10.5 | Teardrop, irregular |
| | 16 | 0.86 | 104 | 10.2 | Eliptic, irregular |
| Example 6 | 17 | 0.83 | 104 | 11.0 | Almost spherical |
| | 18 | 0.82 | 105 | 10.6 | Almost spherical |

Example 7

In a 50-liter stainless steel reactor vessel, equipped with a stirrer, was placed 25 liters of water and 3,180 g of aqueous solution of aluminum sulfate (258 g in terms of $Al_2O_3$). To the solution, heated to and kept at 70° C., was added dropwise with stirring 2,310 g of aqueous solution of sodium aluminate (425 g in terms of $Al_2O_3$). After aging for 5 minutes, there was obtained an alumina hydrate slurry with pH 9.5.

To this slurry were added dropwise 750 g of zirconium nitrate solution (76 g in terms of $ZrO_2$) and 650 g of 14 wt % ammonia water simultaneously. After aging for 5 minutes, there was obtained a zirconia-alumina hydrate slurry with pH 9.0. This slurry was filtered and washed until the content of $Na_2O$ became lower than 0.1 wt %. Thus there was obtained zirconia-alumina hydrate cake (19") containing 10 wt % $ZrO_2$. A portion of this zirconia-alumina hydrate cake (19") was dried at 80° C. for 15 hours and then calcined at 600° C. for 3 hours. There was obtained solid zirconia-alumina (19').

To 455 g of the zirconia-alumina hydrate cake (19",) (equivalent to 100 g of $ZrO_2$—$Al_2O_3$) were added 500 g of solution containing 1.5 wt % sodium alginate (equivalent to 5 times the amount of $ZrO_2$—$Al_2O_3$) and 45 cc of water. After thorough stirring and mixing, there was obtained a slurry containing 10 wt % $ZrO_2$—$Al_2O_3$ (as solids).

This slurry was added dropwise to the same reactor vessel as in Example 1 so as to form spherical hydrogel. After aging for 5 minutes, the spherical gel was washed, dried at 80° C. for 15 hours, and calcined at 600° C. for 3 hours. There was obtained a zirconia-alumina spherical carrier (19).

The thus obtained solid zirconia-alumina (19') and zirconia-alumina spherical carrier (19) were tested for pore characteristics and physical properties. The results are shown in Table 3 below.

It is noted from Table 3 that the zirconia-alumina spherical carrier obtained in this example has almost the same pore characteristics as those of zirconia-alumina hydrate cake as the major raw material and it also has a high breaking strength and good sphericity.

Example 8

The same procedure as in Example 7 to give alumina hydrate cake (19") was repeated except that the amount of zirconium nitrate aqueous solution dropped to the alumina hydrate slurry was changed to 350 g (36 g in terms of $ZrO_2$) or 1,700 g (170 g in terms of $ZrO_2$). There were obtained zirconia-alumina hydrate cake (20") containing 5 wt % $ZrO_2$ and zirconia-alumina hydrate cake (21") containing 20 wt % $ZrO_2$. They were processed into solid zirconia-alumina (20' and 21'). The two kinds of cake (20"and 21") were processed into zirconia-alumina spherical carriers (20 and 21), respectively, in the same way as in Example 7 to give the spherical carrier (19).

The thus obtained solid zirconia-alumina (20' and 21') and zirconia-alumina spherical carrier (20 and 21) were tested for pore characteristics and physical properties. The results are shown in Table 3 below.

It is noted from Table 3 that the zirconia-alumina spherical carrier obtained in this example has almost the same pore characteristics as those of zirconia-alumina hydrate cake even though the content of zirconia in zirconia-alumina hydrate as the major raw material was changed and it also has a high breaking strength and good sphericity.

Comparative Example 5

The same procedure as in Example 7 for the zirconia-alumina spherical carrier (19) was repeated to give zirconia-alumina spherical carriers (22 and 23), except that the amount of the 1.5 wt % solution of sodium alginate added to the zirconia-alumina hydrate cake (19") was changed to one time or 15 times the amount of $ZrO_2$—$Al_2O_3$.

The thus obtained zirconia-alumina spherical carriers (22 and 23) were tested for pore characteristics and physical properties. The results are shown in Table 3 below.

It is noted from Table 3 that the zirconia-alumina spherical carrier (22) (which was produced by giving the polysaccharide solution in an amount outside the range specified in the present invention) has good pore characteristics but takes on an elliptic shape, and the zirconia-alumina spherical carrier (23) has different pore characteristics and is poor in breaking strength.

Comparative Example 6

The same procedure as in Example 7 was repeated to give zirconia-alumina spherical carriers (24 and 25), except that the slurry (formed from the zirconia-alumina hydrate cake (19"), 1.5 wt % solution of sodium alginate, and 5 times as much water) contained 3 wt % of $ZrO_2$—$A_2O_3$ as solids or 25 wt % of $ZrO_2$—$Al_2O_3$ as solids after concentration by heating. The resulting zirconia-alumina spherical carriers (24 and 25) were tested for pore characteristics and physical properties. The results are shown in Table 3 below.

It is noted from Table 3 that the zirconia-alumina spherical carriers (24 and 25) (which were produced from the polysaccharide solution whose concentration is outside the range specified in the present invention) have good pore characteristics but take on an elliptic or teardrop shape and are irregular in particle diameter.

Example 9

The same procedure as in Example 7 for the zirconia-alumina spherical carrier (19) was repeated to give zirconia-alumina spherical carriers (26 and 27) except that the 1.2 wt % solution of calcium chloride was replaced by a 1.5 wt % solution of aluminum chloride or a 1:1 (by weight) mixture of a 1.2 wt % solution of calcium chloride and a 1.5 wt % solution of aluminum chloride. The thus obtained zirconia-alumina spherical carriers (26 and 27) were tested for pore characteristics and physical properties. The results are shown in Table 3 below.

It is noted from Table 3 that the zirconia-alumina spherical carriers obtained in this example have almost the same pore characteristics as those of zirconia-alumina hydrate cake and also have a high breaking strength and good sphericity, regardless of whether the calcium chloride solution was replaced by aluminum chloride solution or a mixture of calcium chloride solution and aluminum chloride solution.

TABLE 3

|  | | Pore characteristics | | Physical properties | |
|---|---|---|---|---|---|
|  | Sample No. | Volume of pores larger than 40 Å (ml/g) | Average pore diameter (Å) | Breaking strength (kg) | Sphericity |
| Example 7 | 19' | 0.74 | 80 | — | — |
|  | 19 | 0.74 | 80 | 13.1 | Almost spherical |
| Example 8 | 20' | 0.81 | 92 | — | — |
|  | 20 | 0.82 | 94 | 11.6 | Almost spherical |
|  | 21' | 0.59 | 64 | — | — |
|  | 21 | 0.60 | 64 | 14.2 | Almost spherical |
| Comparative Example 5 | 22 | 0.75 | 82 | 12.8 | Eliptic |
|  | 23 | 0.88 | 96 | 7.1 | Almost spherical |
| Comparative Example 6 | 24 | 0.75 | 80 | 13.3 | Teardrop, irregular |
|  | 25 | 0.76 | 82 | 13.2 | Eliptic, irregular |
| Example 9 | 26 | 0.73 | 78 | 13.6 | Almost spherical |
|  | 27 | 0.74 | 80 | 13.4 | Almost spherical |

Example 10

In a 50-liter stainless steel reactor vessel, equipped with a stirrer, was placed 25 liters of water and 3,180 g of aqueous solution of aluminum sulfate (258 g in terms of $Al_2O_3$). To the solution, heated to and kept at 70° C., was added dropwise with stirring 2,310 g of aqueous solution of sodium aluminate (425 g in terms of $Al_2O_3$). After aging for 5 minutes, there was obtained an alumina hydrate slurry with pH 9.5.

To this slurry were added dropwise 950 g of titanium sulfate solution (76 g in terms of $TiO_2$) and 865 g of 14 wt % ammonia water simultaneously. After aging for 5 minutes, there was obtained a titania-alumina hydrate slurry with pH 9.3. This slurry was filtered and washed until the content of $Na_2O$ became lower than 0.1 wt %. Thus there was obtained titania-alumina hydrate cake (28") containing 10 wt % $TiO_2$. A portion of this titania-alumina hydrate cake (28") was dried at 80° C. for 15 hours and then calcined at 600° C. for 3 hours. There was obtained solid titania-alumina (28').

To 476 g of the titania-alumina hydrate cake (28") (equivalent to 100 g of $TiO_2$—$Al_2O_3$) were added 500 g of solution containing 1.5 wt % sodium alginate (equivalent to 5 times the amount of $TiO_2$—$Al_2O_3$) and 24 cc of water. After thorough stirring and mixing, there was obtained a slurry containing 10 wt % $TiO_2$—$Al_2O_3$ (as solids).

This slurry was added dropwise to the same reactor vessel as in Example 1 so as to form spherical hydrogel. After aging for 5 minutes, the spherical gel was rinsed, dried at 80° C. for 15 hours, and calcined at 600° C. for 3 hours. There was obtained a titania-alumina spherical carrier (28).

The thus obtained solid titania-alumina (28') and titania-alumina spherical carrier (28) were tested for pore characteristics and physical properties. The results are shown in Table 4 below.

It is noted from Table 4 that the titania-alumina spherical carrier obtained in this example has almost the same pore characteristics as those of titania-alumina hydrate cake as the major raw material and it also has a high breaking strength and good sphericity.

Example 11

The same procedure as in Example 10 to give alumina hydrate cake (28") was repeated except that the amount of titanium sulfate aqueous solution dropped to the alumina hydrate slurry was changed to 257 g (36 g in terms of $TiO_2$) or 1,215 g (170 g in terms of $TiO_2$). There were obtained titania-alumina hydrate cake (29") containing 5 wt % $TiO_2$ and titania-alumina hydrate cake (30") containing 20 wt % $TiO_2$. They were processed into solid titania-alumina (29' and 30'). The two kinds of cake (29" and 30") were processed into titania-alumina spherical carriers (29 and 30), respectively, in the same way as in Example 10 to give the spherical carrier (28).

The thus obtained solid titania-alumina (29' and 30') and titania-alumina spherical carrier (29 and 30) were tested for pore characteristics and physical properties. The results are shown in Table 4 below.

It is noted from Table 4 that the titania-alumina spherical carrier obtained in this example has almost the same pore characteristics as those of titania-alumina hydrate cake even though the content of titania in titania-alumina hydrate as the major raw material was changed and it also has a high breaking strength and good sphericity.

Comparative Example 7

The same procedure as in Example 10 for the titania-alumina spherical carrier (28) was repeated to give titania-alumina spherical carriers (31 and 32), except that the amount of the 1.5 wt % solution of sodium alginate added to the titania-alumina hydrate cake (28") was changed to one time or 15 times the amount of $TiO_2$—$Al_2O_3$.

The thus obtained titania-alumina spherical carriers (31 and 32) were tested for pore characteristics and physical properties. The results are shown in Table 4 below.

It is noted from Table 3 that the titania-alumina spherical carrier (31) (which was produced by giving the polysaccharide solution in an amount outside the range specified in the present invention) has good pore characteristics but takes on an elliptic shape, and the titania-alumina spherical carrier (32) has different pore characteristics and is poor in breaking strength.

Comparative Example 8

The same procedure as in Example 10 was repeated to give titania-alumina spherical carriers (33 and 34), except that the slurry (formed from the titania-alumina hydrate cake (28")), 1.5 wt % solution of sodium alginate, and 5 times as much water) contained 3 wt % of $TiO_2$—$Al_2O_3$ as solids or 25 wt % of $TiO_2$—$Al_2O_3$ as solids after concentration by heating. The resulting titania-alumina spherical carriers (33 and 34) were tested for pore characteristics and physical properties. The results are shown in Table 4 below.

It is noted from Table 4 that the titania-alumina spherical carriers (33 and 34) (which were produced from the polysaccharide solution whose concentration is outside the range specified in the present invention) have good pore characteristics but take on an elliptic or teardrop shape and are irregular in particle diameter.

Example 12

The same procedure as in Example 10 for the titania-alumina spherical carrier (28) was repeated to give titania-alumina spherical carriers (35 and 36) except that the 1.2 wt % solution of calcium chloride was replaced by a 1.5 wt % solution of aluminum chloride or a 1:1 (by weight) mixture of a 1.2 wt % solution of calcium chloride and a 1.5 wt % solution of aluminum chloride. The thus obtained titania-alumina spherical carriers (35 and 36) were tested for pore characteristics and physical properties. The results are shown in Table 4 below.

It is noted from Table 4 that the titania-alumina spherical carriers obtained in this example have almost the same pore characteristics as those of titania-alumina hydrate cake and also have a high breaking strength and good sphericity, regardless of whether the calcium chloride solution was replaced by aluminum chloride solution or a mixture of calcium chloride solution and aluminum chloride solution.

TABLE 4

| | | Pore characteristics | | Physical properties | |
|---|---|---|---|---|---|
| | Sample No. | Volume of pores larger than 40 Å (ml/g) | Average pore diameter (Å) | Breaking strength (kg) | Sphericity |
| Example 10 | 28' | 0.78 | 84 | — | — |
| | 28 | 0.79 | 84 | 12.8 | Almost spherical |
| Example 11 | 29' | 0.84 | 97 | — | — |
| | 29 | 0.84 | 98 | 11.1 | Almost spherical |
| | 30' | 0.62 | 66 | — | — |
| | 30 | 0.63 | 68 | 13.9 | Almost spherical |
| Comparative Example 7 | 31 | 0.78 | 84 | 12.5 | Eliptic |
| | 32 | 0.90 | 99 | 6.7 | Almost spherical |
| Comparative Example 8 | 33 | 0.79 | 86 | 12.5 | Teardrop, irregular |
| | 34 | 0.78 | 84 | 12.2 | Eliptic, irregular |
| Example 12 | 35 | 0.77 | 82 | 12.9 | Almost spherical |
| | 36 | 0.79 | 84 | 12.4 | Almost spherical |

Example 13

The same procedure as in Example I was repeated to give alumina hydrate cake (1"). To 454 g of this alumina hydrate cake (11) (100 in terms of $Al_2O_3$) was added 59 g of commercial alumina hydrate powder (from Condea Co., Ltd.) (43 g or 30 wt % in terms of $Al_2O_3$). After mixing, there was obtained alumina paste. To this alumina paste were added 500 g of 1.5 wt % solution of sodium alginate (5 times the amount of $Al_2O_3$) and 377 cc of water. After thorough mixing, there was obtained a slurry containing 10 wt % solids (in terms of $Al_2O_3$). This slurry was added dropwise to the same reactor vessel as used in Example 1 so as to form spherical hydrogel. After aging for 5 minutes, the hydrogel was washed, dried at 80° C. for 15 hours, and calcined at 600° C. for 3 hours. There was obtained an alumina spherical carrier (37).

The thus obtained alumina spherical carrier (37) was tested for pore characteristics and physical properties. The results are shown in Table 5 below.

It is noted from Table 5 that the alumina spherical carrier obtained in this example has good pore characteristics and also has a high breaking strength and good sphericity.

Example 14

The same procedure as in Example 13 was repeated to give alumina spherical carriers (38, 39, and 40), except that the amount of commercial hydrate powder (from Condea Co., Ltd.), which was added to 454 g (100 g in terms of $Al_2O_3$) of alumina hydrate cake obtained in Example 1, was changed to 36 g (25 g or 20 wt % in terms of $Al_2O_3$), 92 g (67 g or 40 wt % in terms of $Al_2O_3$), and 214 g (150 g or 60 wt % in terms of $Al_2O_3$).

The thus obtained alumina spherical carriers (38, 39, and 40) were tested for pore characteristics and physical properties. The results are shown in Table 5 below.

It is noted from Table 5 that the alumina spherical carriers obtained in this example have good pore characteristics and also have a high breaking strength and good sphericity, regardless of whether the amount of the alumina hydrate powder added to alumina hydrate cake was changed in the range of 20–60 wt % (in terms of oxide). In addition, they have a controlled macropore volume.

Comparative Example 9

The same procedure as in Example 13 for the alumina spherical carrier (37) was repeated to give alumina spherical carriers (41 and 42), except that the amount of the 1.5 wt % solution of sodium alginate added to the alumina paste was changed to one time or 15 times the amount of $Al_2O_3$.

The thus obtained alumina spherical carriers (41 and 42) were tested for pore characteristics and physical properties. The results are shown in Table 5 below.

It is noted from Table 5 that the alumina spherical carrier (41) (which was produced by giving the polysaccharide solution in an amount outside the range specified in the present invention) has good pore characteristics but takes on an elliptic shape, and the alumina spherical carrier (42) has different pore characteristics and is poor in breaking strength.

Comparative Example 10

The same procedure as in Example 13 for the alumina spherical carrier (37) was repeated to give alumina spherical carriers (43 and 44), except that the slurry (formed from the alumina paste, 1.5 wt % solution of sodium alginate, and 5 times as much water) contained 3 wt % of $Al_2O_3$ as solids or 25 wt % of $Al_2O_3$ as solids after concentration by heating. The resulting alumina spherical carriers (43 and 44) were tested for pore characteristics and physical properties. The results are shown in Table 5 below.

It is noted from Table 5 that the alumina spherical carriers (43 and 44) (which were produced from the polysaccharide solution whose concentration is outside the range specified in the present invention) have good pore characteristics but take on an elliptic or teardrop shape and are irregular in particle diameter.

Comparative Example 11

The same procedure as in Example 13 was repeated to give alumina spherical carriers (45 and 46), except that the amount of commercial hydrate powder (from Condea Co., Ltd.), which was added to 454 g (100 g in terms of $Al_2O_3$) of alumina hydrate cake obtained in Example 1, was changed to 36 g (25 g or 10 wt % in terms of $Al_2O_3$) and 459 g (335 g or 70 wt % in terms of $Al_2O_3$).

The thus obtained alumina spherical carriers (45 and 46) were tested for pore characteristics and physical properties. The results are shown in Table 5 below.

It is noted from Table 5 that the alumina spherical carrier (45) obtained in this comparative example, with the amount (in terms of oxide) of the alumina hydrate powder added to the alumina hydrate cake being outside the range specified in the present invention, does not form macropores, and the alumina spherical carrier (46) has macropores largely formed but is too poor in breaking strength to be used as a catalyst carrier.

Example 15

The same procedure as in Example 13 for the alumina spherical carrier (37) was repeated to give alumina spherical carriers (47 and 48) except that the 1.2 wt % solution of calcium chloride was replaced by a 1.5 wt % solution of aluminum chloride or 1:1 (by weight) mixture of a 1.2 wt % solution of calcium chloride and a 1.5 wt % solution of aluminum chloride. The thus obtained alumina spherical carriers (47 and 48) were tested for pore characteristics and physical properties. The results are shown in Table 5 below.

It is noted from Table 5 that the alumina spherical carriers obtained in this example have almost the good pore characteristics and also have a high breaking strength and good sphericity, regardless of whether the calcium chloride solution was replaced by aluminum chloride solution or a mixture of calcium chloride solution and aluminum chloride solution.

TABLE 5

| | Sample No. | Pore characteristics | | Physical properties | |
|---|---|---|---|---|---|
| | | Volume of pores larger than 40 Å (ml/g) | Volume of pores larger than 1,000 Å (ml/g) | Breaking strength (kg) | Sphericity |
| Example 13 | 37 | 0.91 | 0.16 | 8.2 | Almost spherical |
| Example 14 | 38 | 0.88 | 0.09 | 9.8 | Almost spherical |
| | 39 | 1.05 | 0.28 | 7.1 | Almost spherical |
| | 40 | 1.12 | 0.35 | 5.6 | Almost spherical |
| Comparative Example 9 | 41 | 0.89 | 0.14 | 8.1 | Eliptic |
| | 42 | 1.37 | 0.19 | 4.9 | Almost spherical |
| Comparative Example 10 | 43 | 0.90 | 0.15 | 8.0 | Teardrop, irregular |
| | 44 | 0.92 | 0.16 | 7.9 | Eliptic, irregular |

TABLE 5-continued

| | Sample No. | Pore characteristics | | Physical properties | |
|---|---|---|---|---|---|
| | | Volume of pores larger than 40 Å (ml/g) | Volume of pores larger than 1,000 Å (ml/g) | Breaking strength (kg) | Sphericity |
| Comparative Example 11 | 45 | 0.86 | 0.01 | 1.5 | Almost spherical |
| | 46 | 1.44 | 0.47 | 1.7 | Almost spherical |
| Example 15 | 47 | 0.89 | 0.13 | 8.5 | Almost spherical |
| | 48 | 0.91 | 0.16 | 8.1 | Almost spherical |

Example 16

In a 100-liter stainless steel reactor vessel, equipped with a stirrer, was placed 50 liters of water and 6,360 g of aqueous solution of aluminum sulfate (516 g in terms of $Al_2O_3$). To the solution, heated to and kept at 70° C., was added dropwise with stirring 4,620 g of aqueous solution of sodium aluminate (580 g in terms of $Al_2O_3$). After aging, there was obtained an alumina hydrate slurry with pH 9.5. This slurry was filtered and washed until the content of $Na_2O$ became lower than 0.1 wt %. There was obtained alumina hydrate cake.

3,520 g of this cake (650 g in terms of $Al_2O_3$) was thoroughly kneaded with 128 g of orthoboric acid (reagent grade) (72.2 g in terms of $B_2O_3$) by using a two-arm kneader equipped with a heating jacket. There was obtained boria-alumina hydrate paste (49") containing 10 wt % of $B_2O_3$.

A portion of this boria-alumina hydrate paste (49') was dried at 80° C. for 15 hours and then calcined at 600° C. for 3 hours. There was obtained solid boria-alumina (49').

To 476 g of the boria-alumina hydrate paste (49") (equivalent to 100 g of $B_2O_3$—$Al_2O_3$) were added 500 g of solution containing 1.5 wt % sodium alginate (equivalent to 5 times the amount of $B_2O_3$—$Al_2O_3$) and 25 cc of water. After thorough stirring and mixing, there was obtained a slurry containing 10 wt % $B_2O_3$—$Al_2O_3$ (as solids).

This slurry was added dropwise to a 10-liter pyrex reactor vessel, equipped with a stirrer, containing 1.2 wt % solution of calcium chloride, through a dropper with an opening 4.5 mm in diameter, so that spherical gel was formed. After aging for 5 minutes, this spherical hydrogel was collected, rinsed, dried at 80° C. for 15 hours, and finally calcined at 600° C. for 3 hours. Thus there was obtained an boria-alumina spherical carrier (49).

The thus obtained solid boria-alumina (49') and boria-alumina spherical carrier (49) were tested for pore characteristics and physical properties. The results are shown in Table 6 below.

It is noted from Table 6 that the boria-alumina spherical carrier obtained in this example has almost the same pore characteristics as those of boria-alumina hydrate paste as the major raw material and it also has a high breaking strength and good sphericity.

Example 17

The same procedure as in Example 16 to give boria-alumina hydrate paste (49") was repeated except that the amount of orthoboric acid added to 1,053 g of alumina hydrate cake (200 g in terms of $Al_2O_3$) was changed to 11 g (6.2 g in terms of $B_2O_3$) or 62.5 g (35.3 g in terms of $B_2O_3$). There were obtained boria-alumina hydrate paste (50") containing 3 wt % $B_2O_3$ and boria-alumina hydrate paste (51") containing 15 wt % $B_2O_3$. They were processed into solid boria-alumina (50" and 51'). The two kinds of boria-alumina hydrate paste (50" and 51") were processed into boria-alumina spherical carriers (50 and 51), respectively, in the same way as in Example 16 to give the spherical carrier (49).

The thus obtained solid boria-alumina (50' and 51') and boria-alumina spherical carrier (50 and 51) were tested for pore characteristics and physical properties. The results are shown in Table 6 below.

It is noted from Table 6 that the boria-alumina spherical carrier obtained in this example has almost the same pore characteristics as those of boria-alumina hydrate cake even though the content of boria in boria-alumina hydrate as the major raw material was changed and it also has a high breaking strength and good sphericity.

Comparative Example 12

The same procedure as in Example 16 for the boria-alumina spherical carrier (49) was repeated to give boria-alumina spherical carriers (52 and 53), except that the amount of the 1.5 wt % solution of sodium alginate added to the boria-alumina hydrate paste (49") was changed to one time or 15 times the amount of $B_2O_3O$—$Al_2O_3$.

The thus obtained boria-alumina spherical carriers (52 and 53) were tested for pore characteristics and physical properties. The results are shown in Table 6 below.

It is noted from Table 6 that the boria-alumina spherical carrier (52) (which was produced by giving the polysaccharide solution in an amount outside the range specified in the present invention) has good pore characteristics but takes on an elliptic shape, and the boria-alumina spherical carrier (53) has different pore characteristics and is poor in breaking strength.

Comparative Example 13

The same procedure as in Example 16 was repeated to give boria-alumina spherical carriers (54 and 55), except that the slurry (formed from the boria-alumina hydrate paste (49"), 1.5 wt % solution of sodium alginate, and 5 times as much water) contained 3 wt % of $B_2O_3$—$Al_2O_3$ as solids or 25 wt % of $B_2O_3$—$Al_2O_3$ as solids after concentration by heating. The resulting boria-alumina spherical carriers (54 and 55) were tested for pore characteristics and physical properties. The results are shown in Table 6 below.

It is noted from Table 6 that the boria-alumina spherical carriers (54 and 55) (which were produced from the slurry whose concentration is outside the range specified in the present invention) have good pore characteristics but take on an elliptic or teardrop shape and are irregular in particle diameter.

Example 18

The same procedure as in Example 16 for the boria-alumina spherical carrier (49) was repeated to give boria-alumina spherical carriers (56 and 57) except that the 1.2 wt % solution of calcium chloride was replaced by a 1.5 wt % solution of aluminum chloride or 1:1 (by weight) mixture of a 1.2 wt % solution of calcium chloride and a 1.5 wt % solution of aluminum chloride. The thus obtained boria-alumina spherical carriers (56 and 57) were tested for pore characteristics and physical properties. The results are shown in Table 6 below.

It is noted from Table 6 that the boria-alumina spherical carriers obtained in this example have almost the same pore characteristics as those of boria-alumina hydrate cake and also have a high breaking strength and good sphericity, regardless of whether the calcium chloride solution was replaced by aluminum chloride solution or a mixture of calcium chloride solution and aluminum chloride solution.

TABLE 6

| | | Pore characteristics | | Physical properties | |
|---|---|---|---|---|---|
| | Sample No. | Volume of pores larger than 20 Å (ml/g) | Average pore diameter (Å) | Breaking strength (kg) | Sphericity |
| Example 16 | 49' | 0.70 | 90 | — | — |
| | 49 | 0.69 | 100 | 13.4 | Almost spherical |
| Example 17 | 50' | 0.74 | 110 | — | — |
| | 50 | 0.74 | 108 | 12.3 | Almost spherical |
| | 51' | 0.66 | 92 | — | — |
| | 51 | 0.67 | 90 | 13.8 | Almost spherical |
| Comparative Example 12 | 52 | 0.71 | 100 | 12.6 | Eliptic |
| | 53 | 0.83 | 113 | 7.2 | Almost spherical |
| Comparative Example 13 | 54 | 0.69 | 98 | 12.7 | Teardrop, irregular |
| | 55 | 0.71 | 102 | 12.5 | Eliptic, irregular |
| Example 18 | 56 | 0.68 | 99 | 13.6 | Almost spherical |
| | 57 | 0.70 | 100 | 13.0 | Almost spherical |

Example 19

The procedure of Example 16 for the boria-alumina spherical carrier (49) was repeated except that the calcining temperature was changed to 1,000° C., 1,100° C., 1,200° C., and 1,300° C. There were obtained boria-alumina spherical carriers (58, 59, 60, and 61). Their specific surface area was measured by nitrogen gas adsorption method and calculated by the BET formula. It was found that the boria-alumina spherical carriers (58, 59, 60, and 61) each has a specific surface area of 91 m$^2$/g, 49 m$^2$/g, 24 m$^2$/g, and 10 m$^2$/g.

This suggests that the spherical carriers of boria-alumina composition have a high specifics surface area and good heat resistance even though they undergo calcining at high temperatures.

Example 20

In a 50-liter stainless steel reactor vessel, equipped with a stirrer, was placed 25 liters of water and 3,180 g of aqueous solution of aluminum sulfate (258 g in terms of $Al_2O_3$). To the solution, heated to and kept at 70° C., was added dropwise with stirring 2,310 g of aqueous solution of sodium aluminate (425 g in terms of $Al_2O_3$). After aging, there was obtained an alumina hydrate slurry with pH 9.5.

To this slurry was added 22 g of 30% nitric acid for adjustment to pH 6.0. To this slurry was further added 607 g of aqueous solution of sodium silicate (85 g in terms of $SiO_2$). After aging, there was obtained an alumina hydrate slurry with pH 8.5. This slurry was filtered and washed until the content of $Na_2O$ became lower than 0.1 wt %. There was obtained silica-alumina hydrate cake containing 11 wt % of $SiO_2$.

3,520 g of this cake (650 g in terms of $SiO_2$—$Al_2O_3$) was thoroughly kneaded with 60.6 g of orthoboric acid (reagent grade) (34.2 g in terms of $B_2O_3$) by using a two-arm kneader equipped with a heating jacket. There was obtained boria-silica-alumina hydrate paste (62") containing 5 wt % of $B_2O_3$ and 10.5 wt % of $SiO_2$.

A portion of this boria-silica-alumina hydrate paste (62) was dried at 80° C. for 15 hours and then calcined at 600° C. for 3 hours. There was obtained solid boria-silica-alumina (62").

To 476 g of the boria-silica-alumina hydrate paste (62") (equivalent to 100 g of $B_2O_3$—$SiO_2$—$Al_2O_3$) were added 500 g of solution containing 1.5 wt % sodium alginate (equivalent to 5 times the amount of $B_2O_3$—$SiO_2$—$Al_2O_3$) and 25 cc of water. After thorough stirring and mixing, there was obtained a slurry containing 10 wt % $B_2O_3$—$SiO_2$—$Al_2O_3$ (as solids).

This slurry was added dropwise to a 10-liter pyrex reactor vessel, equipped with a stirrer, containing 1.2 wt % solution of calcium chloride, through a dropper with an opening 4.5 mm in diameter, so that spherical hydrogel was formed. After aging for 5 minutes, this spherical hydrogel was collected, washed, dried at 80° C. for 15 hours, and finally calcined at 600° C. for 3 hours. Thus there was obtained an boria-silica-alumina spherical carrier (62).

The thus obtained solid boria-silica-alumina (62') and boria-silica-alumina spherical carrier (62) were tested for pore characteristics and physical properties. The results are shown in Table 7 below.

It is noted from Table 7 that the boria-silica-alumina spherical carrier obtained in this example has almost the same pore characteristics as those of boria-silica-alumina hydrate cake as the major raw material and it also has a high breaking strength and good sphericity.

Example 21

The same procedure as in Example 20 to give alumina hydrate cake (62") was repeated except that the amount of sodium silicate solution added to alumina hydrate slurry was changed to 257 g (36 g in terms of $SiO_2$) or 1,215 g (170 g in terms of $SiO_2$). There were obtained silica-alumina hydrate cake containing 5 wt % of $SiO_2$ and silica-alumina hydrate cake containing 20 wt % of $SiO_2$. They were given orthoboric acid so that they contain 5wt % of $B_2O_3$. There were obtained boria-silica-alumina hydrate paste (63") containing 5 wt % of $B_2O_3$ and 4.8 wt % of $SiO_2$, boria-silica-alumina hydrate paste (64") containing 5 wt % of $B_2O_3$ and 19 wt % of $SiO_2$, and solid boria-silica-alumina (63"and 64"). The two kinds of boria-silica-alumina hydrate (63" and 64") were processed into boria-silica-alumina spherical carriers (63 and 64) in the same way as for the spherical carrier (62).

The thus obtained solid boria-silica-alumina (63' and 64') and boria-silica-alumina spherical carrier (63 and 64) were tested for pore characteristics and physical properties. The results are shown in Table 7 below.

It is noted from Table 7 that the boria-silica-alumina spherical carrier obtained in this example has almost the same pore characteristics as those of boria-silica-alumina hydrate cake even though the content of silica in boria-silica-alumina hydrate paste as the major raw material was changed and it also has a high breaking strength and good sphericity.

Comparative Example 14

The same procedure as in Example 20 for the boria-silica-alumina spherical carrier (62) was repeated to give boria-silica-alumina spherical carriers (65 and 66), except that the amount of the 1.5 wt % solution of sodium alginate added to the boria-silica-alumina hydrate paste (62") was changed to one time or 15 times the amount of $B_2O_3$—$SiO_2$—$Al_2O_3$.

The thus obtained boria-silica-alumina spherical carriers (65 and 66) were tested for pore characteristics and physical properties. The results are shown in Table 7 below.

It is noted from Table 7 that the boria-silica-alumina spherical carrier (65) (which was produced by giving the polysaccharide solution in an amount outside the range specified in the present invention) has good pore characteristics but takes on an elliptic shape, and the boria-silica-alumina spherical carrier (66) has different pore characteristics and is poor in breaking strength.

Comparative Example 15

The same procedure as in Example 20 was repeated to give boria-silica-alumina spherical carriers (67 and 68), except that the slurry (formed from the boria-silica-alumina hydrate paste (62"), 1.5 wt % solution of sodium alginate, and 5 times as much water) contained 3 wt; of $B_2O_3$—$SiO_2$—$Al_2O_3$ as solids or 25 wt % of $B_2O_3$—$SiO_2$—$Al_2O_3$ as solids after concentration by heating. The resulting boria-silica-alumina spherical carriers (67 and 68) were tested for pore characteristics and physical properties. The results are shown in Table 7 below.

It is noted from Table 7 that the boria-silica-alumina spherical carriers (67 and 68) (which were produced from the slurry whose concentration is outside the range specified in the present invention) have good pore characteristics but take on an elliptic or teardrop shape and are irregular in particle diameter.

The same procedure as in Example 20 for the boria-silica-alumina spherical carrier (62) was repeated to give boria-silica-alumina spherical carrier (69 and 70) except that the 1.2 wt % solution of calcium chloride was replaced by a 1.5 wt % solution of aluminum chloride 1:1 (by weight) mixture of a 1.2 wt % solution of calcium chloride and a 1.5 wt % solution of aluminum chloride. The thus obtained boria-silica-alumina spherical carriers (69 and 70) were tested for pore characteristics and physical properties. The results are shown in Table 7 below.

It is noted from Table 7 that the boria-silica-alumina spherical carriers obtained in this example have almost the same pore characteristics as those of boria-silica-alumina hydrate cake and also have a high breaking strength and good sphericity, regardless of whether the calcium chloride solution was replaced by aluminum chloride solution or a mixture of calcium chloride solution and aluminum chloride solution.

TABLE 7

| | | Pore characteristics | | Physical properties | |
| --- | --- | --- | --- | --- | --- |
| | Sample No. | Volume of pores larger than 20 Å (ml/g) | Average pore diameter (Å) | Breaking strength (kg) | Sphericity |
| Example 20 | 62' | 0.76 | 97 | — | — |
| | 62 | 0.77 | 97 | 11.8 | Almost spherical |

TABLE 7-continued

| | | Pore characteristics | | Physical properties | |
|---|---|---|---|---|---|
| | Sample No. | Volume of pores larger than 20 Å (ml/g) | Average pore diameter (Å) | Breaking strength (kg) | Sphericity |
| Example 21 | 63' | 0.69 | 84 | — | — |
| | 63 | 0.68 | 86 | 13.1 | Almost spherical |
| | 64' | 0.82 | 116 | — | — |
| | 64 | 0.84 | 114 | 9.6 | Almost spherical |
| Comparative Example 14 | 65 | 0.76 | 97 | 11.3 | Eliptic |
| | 66 | 0.87 | 108 | 6.6 | Almost spherical |
| Comparative Example 15 | 67 | 0.75 | 98 | 11.5 | Teardrop, irregular |
| | 68 | 0.76 | 98 | 11.2 | Eliptic, irregular |
| Example 22 | 69 | 0.73 | 94 | 12.3 | Almost spherical |
| | 70 | 0.77 | 98 | 11.6 | Almost spherical |

Example 23

The procedure Of Example 20 for the boria-silica-alumina spherical carrier (62) was repeated except that the calcining temperature was changed to 1,000° C., 1,100° C., 1,300° C., and 1,400° C. There were obtained boria-silica-alumina spherical carriers (71, 72, 73, and 74). Their specific surface area was measured by nitrogen gas adsorption method and calculated by the BET formula. It was found that the boria-silica-alumina spherical carriers (71, 72, 73, and 74) each has a specific surface area of 123 m$^2$/g, 66 m$^2$/g, 28 m$^2$/g, and 12 m$^2$/g.

This suggests that the spherical carriers of boria-silica-alumina composition have a high specifics surface area and good heat resistance even though they undergo calcining at high temperatures.

As mentioned above, the present invention provides a process for producing spherical catalyst carrier of silica, silica-alumina composition, zirconia-alumina composition, titania-alumina composition, boria-alumina composition, or boria-silica-alumina composition which has almost the same pore characteristics as alumina hydrate gel, silica-alumina hydrate gel, zirconia-alumina hydrate gel, or titania-alumina hydrate gel (or alumina hydrate paste, boria-alumina hydrate paste, or boria-silica-alumina hydrate paste) as the major raw material, has uniform sphericity and smooth surface and homogeneity, and has a macropore volume that can be controlled. Therefore, the present invention is of industrial value.

What is claimed is:

1. A process for producing a spherical catalyst carrier which comprises the steps of (a) mixing alumina hydrate powder with alumina hydrate gel to form alumina hydrate paste, (b) adding a polysaccharide solution to said alumina hydrate paste, (c) mixing said polysaccharide solution and said alumina hydrate paste to form a slurry of controlled concentration, (d) dropping said slurry into a solution containing multivalent ions, thereby forming spherical hydrogel, and (e) aging, washing, drying and calcining said spherical hydrogel.

2. A process for producing a spherical catalyst carrier as defined in claim 1, wherein the amount of alumina hydrate powder used in step (a) is 20–60 wt % of the alumina hydrate gel (in terms of oxide).

3. A process for producing a spherical catalyst carrier as defined in claim 1, wherein the polysaccharide solution used in step (b) is a 1.0–3.0 wt % solution of low-methoxyl pectin or sodium alginate.

4. A process for producing a spherical catalyst carrier as defined in claim 1, wherein the amount of said polysaccharide solution used in step (a) is 3–10 times the amount of said alumina hydrate gel in terms of oxide (by weight).

5. A process for producing a spherical catalyst carrier which comprises the steps of (a) adding a polysaccharide solution to a boria-alumina or a boria-silica-alumina hydrate paste, (b) mixing said polysaccharide solution and said boria-alumina hydrate or boria-silica-alumina paste to form a slurry of controlled concentration, (c) dropping said slurry into a solution containing multivalent metal ions, thereby forming spherical hydrogel, and (d) aging, washing, drying and calcining said spherical hydrogel.

6. A process for producing a spherical catalyst carrier as defined in claim 5, wherein said polysaccharide solution used in step (a) is a 1.0–3.0 wt % solution of low-methoxyl pectin or sodium alginate.

7. A process for producing a spherical catalyst carrier as defined in claim 5, wherein the amount of said polysaccharide solution used in step (a) is 3–10 times the amount of said hydrate paste in terms of oxide (by weight).

8. A process for producing a spherical catalyst carrier as defined in claim 5, wherein the slurry of step (b) contains 5–20 wt % of boria-alumina or boria-silica-alumina in terms of oxide.

9. A process for producing a spherical catalyst carrier as defined in claim 5, wherein the spherical hydrogel is a boria-alumina hydrogel and wherein in step (d) the spherical boria-alumina hydrogel is dried at 60–120° C. and calcined at 500–1,300° C.

10. (Amended) A process for producing a spherical catalyst carrier as defined in claim 5, wherein the spherical hydrogel is a boria-silica-alumina hydrogel, and wherein in step (d) the spherical boria-silica-alumina is dried at 60–120° C. and calcined at 500–1,400° C.

* * * * *